T. B. LAMBERT.
WEIGHING MACHINE.
APPLICATION FILED MAY 24, 1920.

1,374,456.

Patented Apr. 12, 1921.
6 SHEETS—SHEET 1.

INVENTOR
THOMAS B. LAMBERT
BY Edward B. Birkenbeul
ATTORNEY.

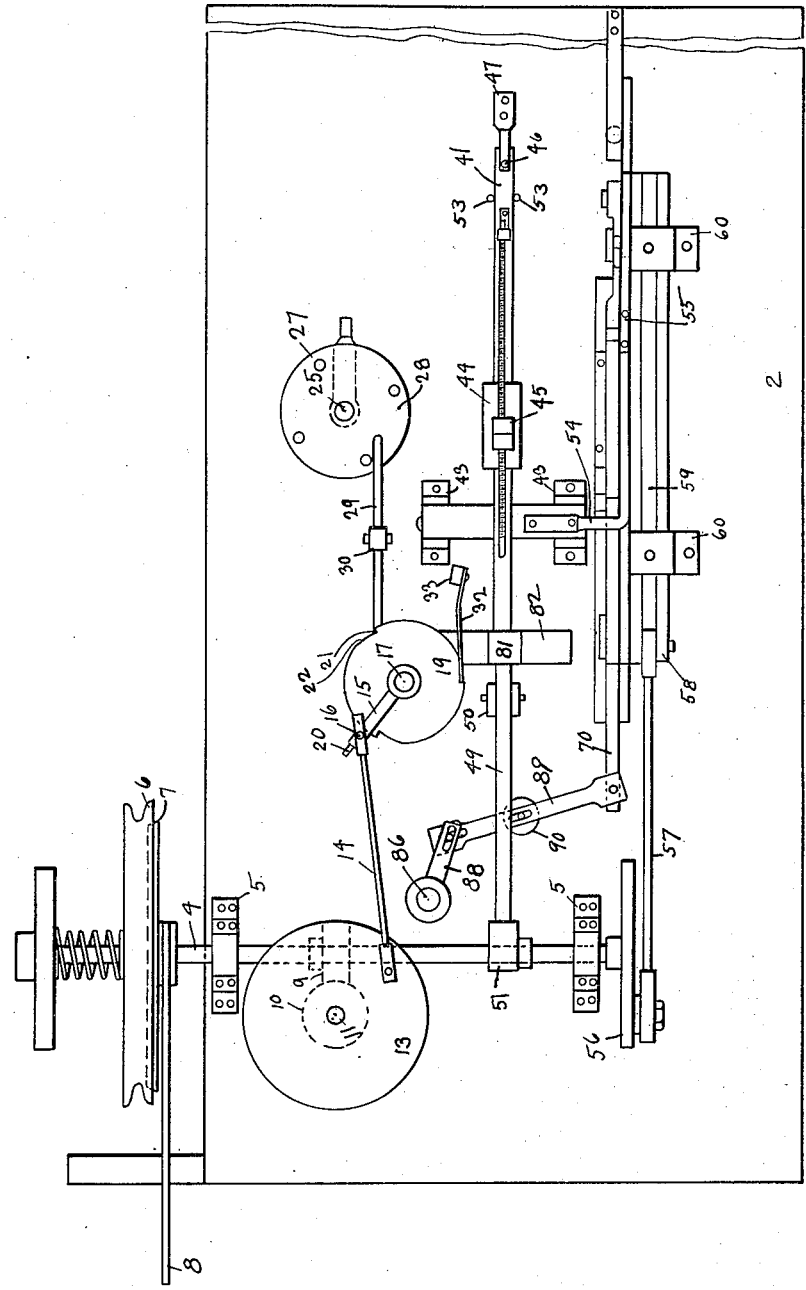

T. B. LAMBERT.
WEIGHING MACHINE.
APPLICATION FILED MAY 24, 1920.

1,374,456.

Patented Apr. 12, 1921.
6 SHEETS—SHEET 4.

INVENTOR
Thomas B. Lambert.
By Edward B. Birkenbeuel.
Attorney.

T. B. LAMBERT.
WEIGHING MACHINE.
APPLICATION FILED MAY 24, 1920.
1,374,456.
Patented Apr. 12, 1921.
6 SHEETS—SHEET 5.
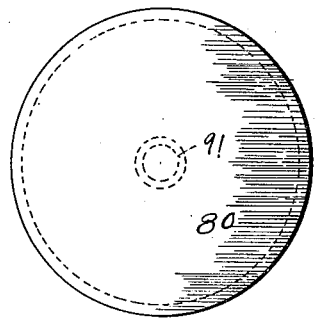
FIG. 13
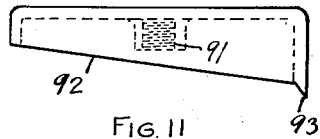
FIG. 11
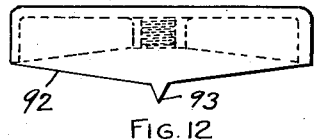
FIG. 12
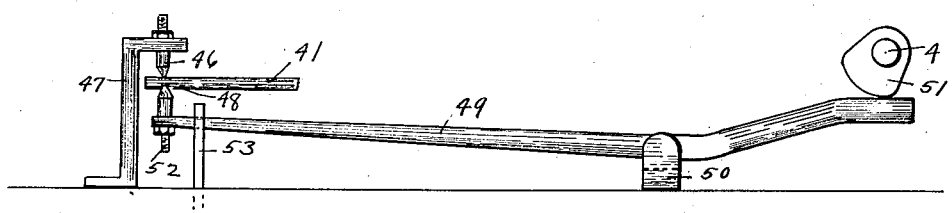
FIG. 10
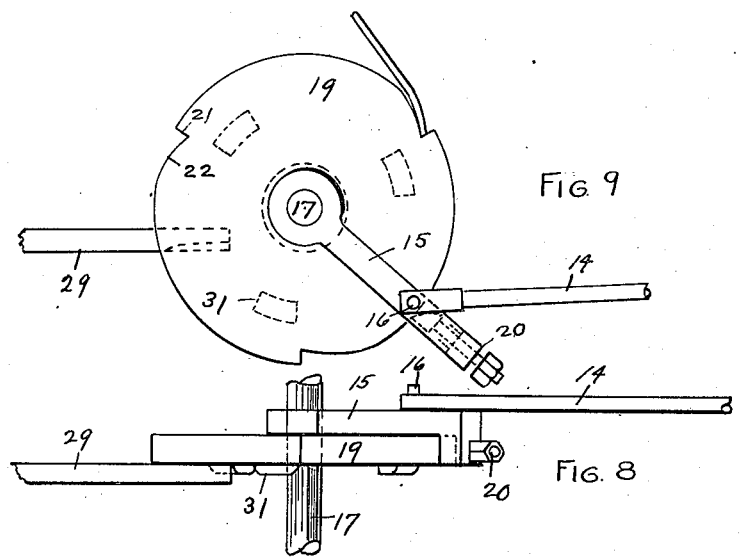
FIG. 9
FIG. 8
INVENTOR
THOMAS B. LAMBERT
BY Edward B. Birkenbeul
ATTORNEY T. B. LAMBERT.
WEIGHING MACHINE.
APPLICATION FILED MAY 24, 1920.
1,374,456.
Patented Apr. 12, 1921.
6 SHEETS—SHEET 6.
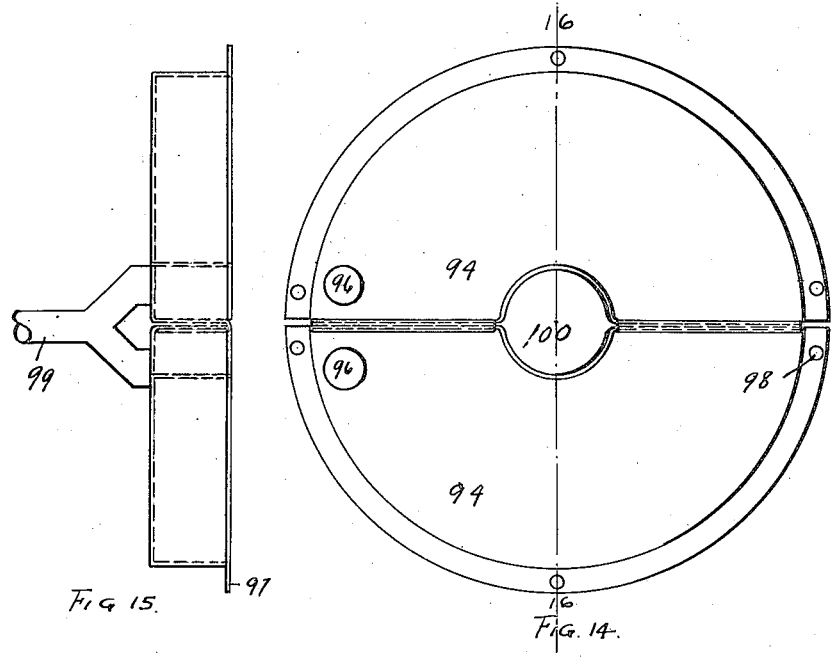
INVENTOR
THOMAS B. LAMBERT
BY Edward B. Birkenbeul.
ATTORNEY.

UNITED STATES PATENT OFFICE.

THOMAS B. LAMBERT, OF PORTLAND, OREGON.

WEIGHING-MACHINE.

1,374,456. Specification of Letters Patent. Patented Apr. 12, 1921.

Application filed May 24, 1920. Serial No. 383,785.

*To all whom it may concern:*

Be it known that I, THOMAS B. LAMBERT, a citizen of the United States, and resident of Portland, in the county of Multnomah and State of Oregon, have invented a new and useful Improvement in Weighing-Machines, of which the following is a specification.

This invention relates more particularly to that class of machines which are used in segregating under-weight packages and cans without personal attention from the operator.

The object of my invention is to provide an exceedingly simple and efficient machine for detecting and removing any underweight packages or cans from a quantity of merchandise without handling or observing the weight of each article, and to do so in a manner which will permit extreme accuracy of selection and rapidity in handling the articles at a minimum of expense.

Figure 1:
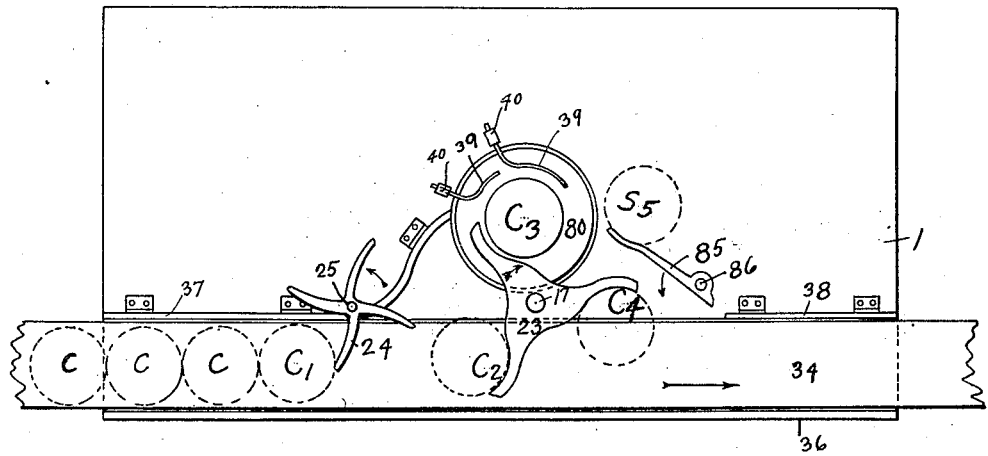
Figure 2:
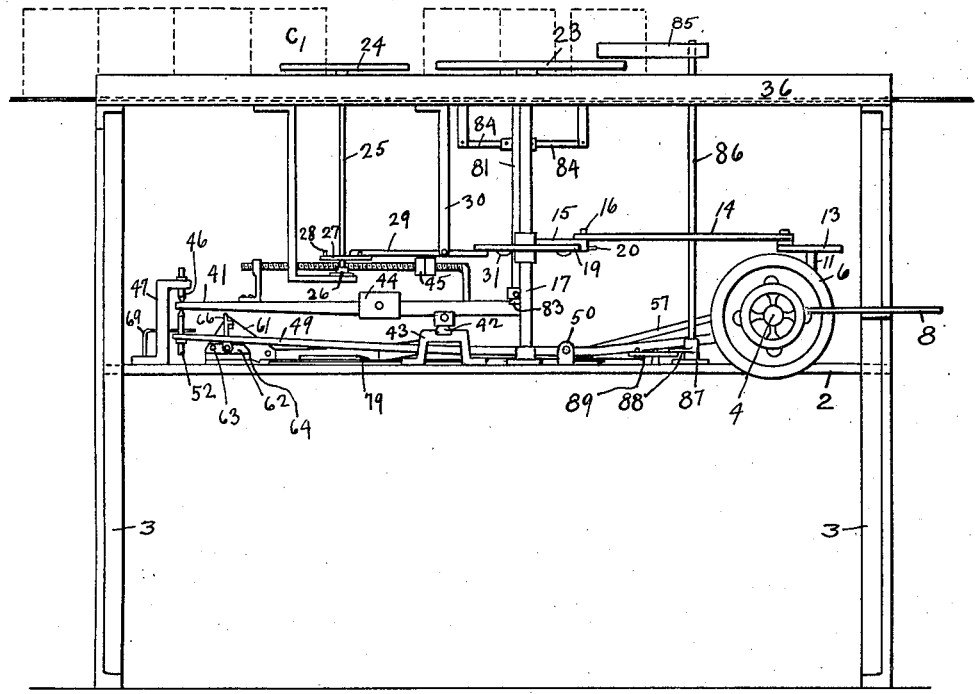
Figure 4:
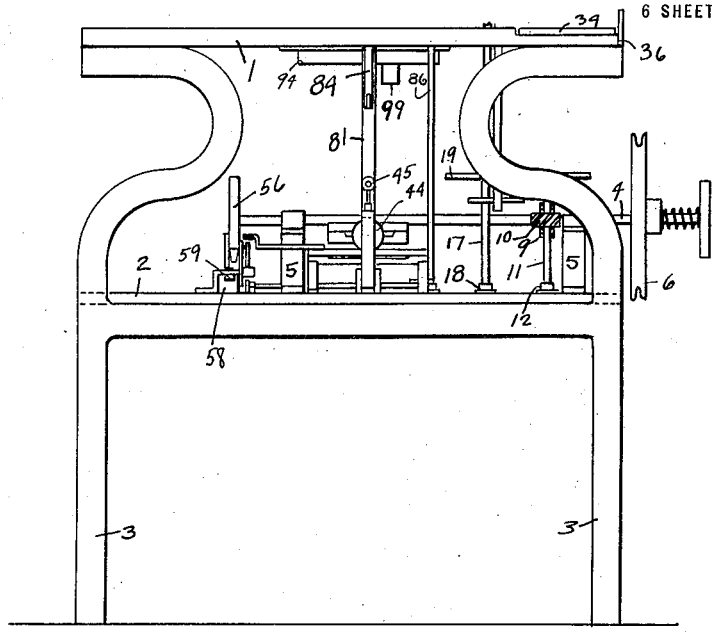
Figure 3:
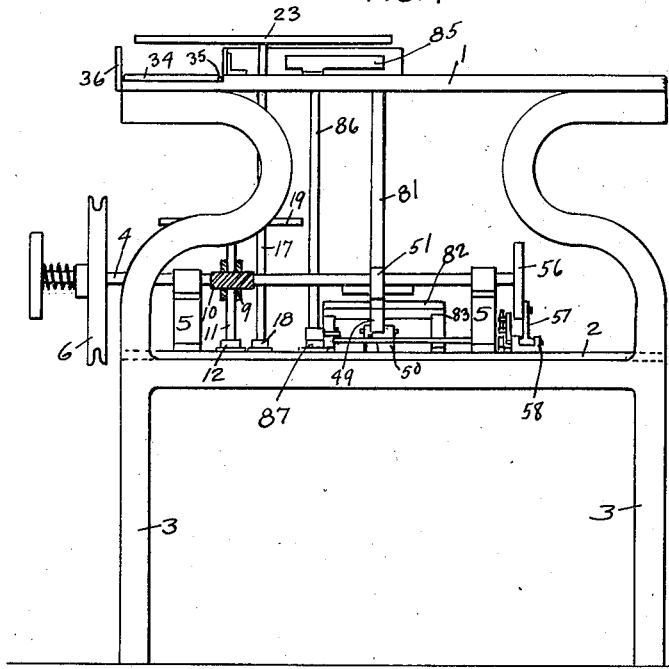
Figure 7:
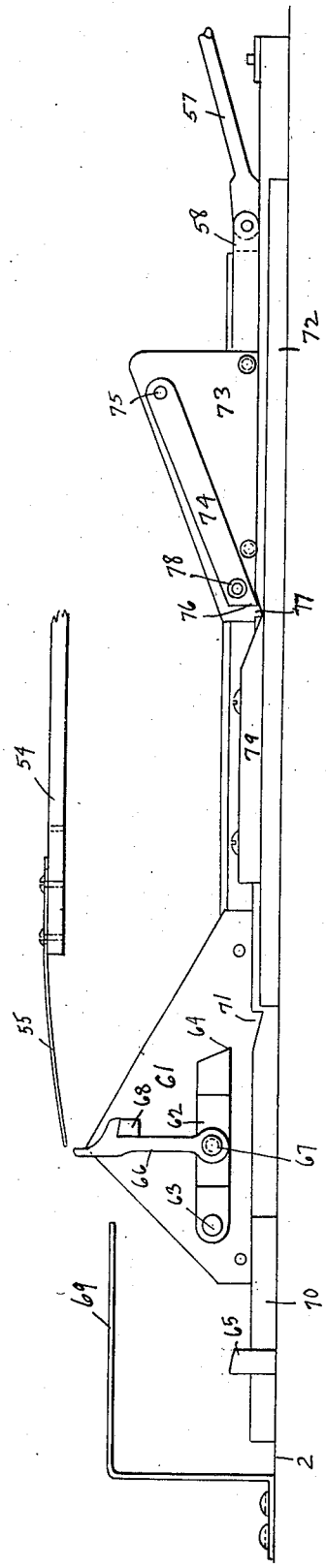
Figure 6:
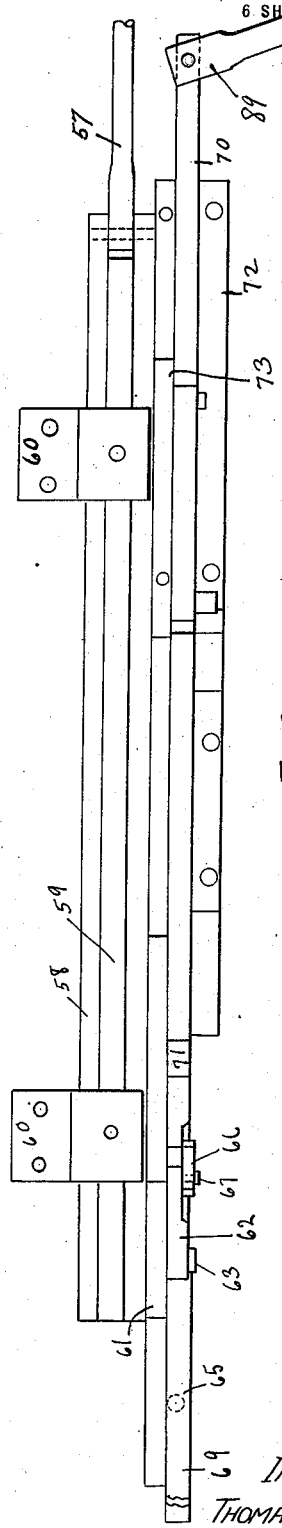

I accomplish these results in the manner described in the following specifications and illustrated in accompanying drawings, in which:

Figure 1 is a plan view of the machine of which Fig. 2 is a front elevation, Fig. 3 a discharging end elevation and Fig. 4 the receiving end elevation of the machine. Fig. 5 is a plan of the machine with the upper table portion removed. Fig. 6 is a detailed plan of the segregating operating mechanism of which Fig. 7 is the plan view. Fig. 8 is an enlarged detail of the can handling and feeding mechanism of which Fig. 9 is a plan. Fig. 10 is a detailed elevation of the scale beam locking mechanism. Fig. 11 is a detailed elevation of the scale pan of which Fig. 12 is a side elevation and Fig. 13 a plan. Fig. 14 is a detailed plan showing the dripping pan underneath the scale pan of which Fig. 15 is a side elevation and Fig. 16 a front elevation. Fig. 17 is a section taken along the line 16—16 in Fig. 14.

Similar numbers of reference refer to the same or similar parts throughout the several views.

Referring in detail to the drawings, I have constructed my device of an upper table member 1 and a lower table member 2 which are held in their proper relation by side frames 3. On the lower table 2 I have mounted a main shaft 4 in the bearings 5. Near the outer end of the main shaft 4 I have placed a driving pulley 6 which receives rotative power through the friction clutch 7 under the control of the lever 8.

Between the bearings 5 on the shaft 4 I have secured a helical gear 9 which drives a second helical gear 10 on a vertical shaft 11 which journals in the bearings 12. On the upper end of the shaft 11 is mounted a crank disk 13 which actuates a connecting rod 14 attached to a can handling arm 15, by means of the joint 16. A vertical can handling shaft 17, which acts as a pivot for the arm 15, is supported by the bearings 18. Underneath the arm 15 and secured on the shaft 17 is an index plate 19 which receives a partial rotation from the arm 15 through the spring-loaded plunger 20 which is mounted on said arm.

The square faces 21 of the index notches in the plate 19 permit of a positive transfer of motion from the arm 15 to the index plate 19 in one direction. The angled faces 22 of the index notches provide a frictional connection for transferring motion in the opposite direction, the reason of which will be explained further.

On the upper end of the can handling shaft 17 is secured a can handling star wheel 23 which is on the upper side of the upper table 1. This wheel 23 has three arms which are curved to conform with the packages or cans being handled.

A can feeding star wheel 24 is also mounted on the upper side of the upper table 1 and is secured to a shaft 25 whose lower end is journaled in a bearing 26 which is suitably supported. A feed controlling disk 27 is mounted on the shaft 25 above the bearing 26. On the upper side of the disk 27 are positioned the stop pins 28 which engage a feed controlling lever 29 which is mounted on the fulcrum standard 30, which lever is operated by cams 31 on the under side of the index plate 19, that is to say, when a cam lobe 31 actuates the lever 29 a stop 28 is permitted to pass, which permits a partial rotation of the can feeding star wheel 24 an amount which will permit one can or package $C^1$ to pass, somewhat in the fashion of a turn stile.

An adjustable index finger 32 in the form of a spring bearing against the notched periphery of the plate 19 is mounted on the standard 33 which permits the accurate placing of each article to be weighed in the center of the scale pan. A conveyer belt 34, such as is in common use, lies in a groove 35 on the upper side of the table 1 and has along its outer edge a guard rail 36, and along its inner and receiving end a shorter guard rail 37 which is curved at one end toward the scale pan. A still shorter guard rail 38 is placed on the inner discharging end of the groove 35.

A pair of can positioning arms 39 are also mounted on the upper table 1 in an adjustable manner from the standards 40. These tend to assist in the proper placing of the articles to be weighed.

Above the lower table 2 is mounted the horizontal scale beam 41 on the fulcrum points 42 of the standards 43. A scale weight 44 is capable of being secured to the beam 41 and a micrometer adjustment 45 is provided on the upper side of the scale beam 41 in a manner which will prevent vibration. The travel of the scale beam tip upwardly from its balanced position is limited by the adjustable stop 46 on the standard 47 which is secured to the lower table 2. On the under side of the scale beam tip directly beneath the stop 46 I have provided a countersunk hole 48.

A scale beam locking arm 49 is pivotally mounted directly underneath the scale beam 41 on the standard 50 and is actuated by means of a locking cam 51 on the shaft 4. The point of the locking arm 49 is provided with an adjustable locking point 52 which is adapted to enter the countersunk hole 48 during the locking operation. The two vertical pins 53 prevent lateral motion of the locking point end of the arm 49. Attached to the scale beam is a selecting arm 54 having an adjustable tip 55.

On the end of the shaft 4 opposite the driving pulley 6 is mounted a crank disk 56 joined by a connecting rod 57 to a grooved slide 58 which is guided by a bar 59 supported by the standards 60 which are secured to the lower table 2. A cutout mechanism bracket 61 is formed on one end of the slide 58 and against which is hinged a cut-out pawl 62 on the pivot 63. The swinging end of the pawl 62 is provided with a pointed tip 64. Mounted on the table 2 and underneath the line of travel of the pawl 62 is a pawl returning cam 65 which returns it to a horizontal position when passing over the cam in which position it is secured by a supporting latch 66 which is joined to the pawl 62 by means of the pivot 67. From the side of the bracket 61 projects a latch pin 68 with which the latch 66 is brought into engagement by coming in contact with the latch engaging arm 69. A cut-out bar 70 is arranged to slide alongside of the grooved slide 58 and directly underneath the cut-out pawl 62. A notch 71 in the bar 70 is adapted to engage the tip 64 of the pawl 62 whenever the supporting latch 66 is not held by the pin 68.

A second bracket 73 for the cut-out bar returning mechanism is also mounted on the slide 58. On the side of this bracket is hinged the pawl 74 by means of the pivot 75. A tip 76 of the pawl 74 is adapted to engage the notch 77 which is also on the upper side of the cut-out bar 70. A roller 78 is mounted on the side of the pawl 74 and adapted to ride on the cam 79 which is secured on the upper side of the guide 72.

Occupying a circular opening in the upper table 1 is a scale pan 80 mounted on a vertical column 81 rising from a base 82 whose points 83 rest on the scale beam 41. On the under side of the table top 1 and hinged loosely to the column 81 are the scale pan positioning links 84 which hold the pan correctly in one plane while the wide base 82 of the column 81 stabilizes the column in the lateral direction.

A cut-out arm 85 is also provided on the upper side of the table top 1 and is mounted on a vertical shaft 86 whose lower end journals in the bearing 87 above which is a slotted actuating arm 88 which is joined to a double slotted lever 89 on the standard 90 and hinged to the cut-out bar 70.

On the under side of the scale pan 80 is a threaded socket 91 which permits a correct vertical adjustment on the scale pan 80. The under side of the scale pan 80 has a sloping lower edge 92 whose lowermost side terminates in a dripping point 93 which tends to minimize the amount of moisture adhering to the scale pan. Attached to the under side of the table top 1 and underneath the scale pan 80 I have secured a dripping pan 94 whose parting line is covered by the turned edge 95. Outlets 96 are provided for the accumulated moisture. The dripping pan is secured along the edge 97 by means of screws through the holes 98. The outlets 96 drain into the pipes 99 which may carry the water away in the most convenient manner. A central opening 100 is provided in the center of the scale pan to provide a free working of the scale pan column 81.

The operation of my device is as follows: The cans C are placed upon the conveyer 34, either manually or as discharged from a machine or conveyer, and are carried along until the can $C^1$ comes in contact with an arm of the star wheel 24 which is prevented from rotating by the stops 28 coming in contact with the lever 29. Upon rotating the shaft 4 by means of the pulley 6 the crank disk 13 is also rotated and an oscillating motion is delivered to the can handling arm 15 by means of the connecting rod 14. One revolution of the disk 13 provides one-third of a revolution on the can handling arm 19. This one-third revolution of the arm 15 drives the index plate 19 one-third of a revolution by the engagement of the spring-loaded plunger 20 with the square face 21. This movement of the index plate 19 and its underlying cam lobes 31 actuates the lever 29 and permits one stop 28 of the feed controlling disk 27 to pass the lever 29 or to permit a rotation of the can feeding star wheel 24 one-quarter of a revolution, which permits the can $C^1$, which is being held against the star wheel by the movement of the conveyer belt 34, to pass on until it engages an arm of the can handling star wheel 23 which lies across the conveyer belt. It is evident that the following cans are stopped when the star wheel 24 is again locked.

The succeeding one-third revolution of the index plate 19 on its shaft 17 naturally provides a similar movement to the star wheel 23 which carries the can $C^2$ to the center of the scale pan 80 and is prevented from being moved too far by the arms 39. In order that the arm of the star wheel 23 does not remain in contact with the package $C^3$ while it is being weighed I have adjusted the index arm 32 in a manner that it will have a small amount of lost motion which will permit the index plate 19 and its attached star wheel 23 to back up slightly after the article has been deposited on the center of the scale pan 80, which backing up motion is provided by the frictional movement of the plunger 20 climbing over the angled face 22 on its return stroke. The next succeeding movement of the star wheel 23 moves the can $C^4$ back on to the moving conveyer belt 34 by which it is discharged from the machine. This, of course, only occurs when the can is equal to or above the required weight. What occurs when the can is under-weight will be set forth presently.

After an article has been placed on the scale pan 80 the cam 51 releases the locking arm 49 which in turn releases the scale beam 41 whose weights have previously been adjusted for a minimum weight can. If the can lacks weight the scale beam 41 naturally descends and with it drops the selecting arm 54 with its adjustable tip 55. Bearing in mind the fact that the slide 58 is continually oscillated by means of the connecting rod 57 and that the supporting latch 66 which is carried thereon is directly underneath the tip 55 it will be seen that the dropping of the point 55 in front of the latch 66 will unlatch same from the pin 68 and permit the cut-out pawl 62 to rest on the cut-out bar 70 and the point 64 to engage the notch 71, thereby moving the cut-out bar 70. It will be noticed that this cut-out bar 70 through the lever 89 and the arm 88 moves the tip of the cut-out arm 85 toward the star wheel 23 so that the light weight can $C^5$ when removed from the scale pan 80 is not carried upon the conveyer 34 but is intercepted by the arm 85 and thereby segregated from the full weight cans.

In order to return the cut-out bar 70 to its rest position I have provided the before described pawl 74, which, in the backward travel of the slide 58, engages the notch 77 and moves the bar backward until the pawl 62 has been raised by the cam 65 to its horizontal position and the latch 66 has, by contact with the arm 69, been again latched upon the pin 68. The backward travel of the cut-out bar 70 is limited by the riding of the roller 78 on the cam 79 which disengages the point 76 from the notch 77.

It will be seen in the construction of my device that I have provided adjustments between the various units which will enable their correct relation to be maintained to a nicety not otherwise attainable.

It will be observed in Fig. 6 that I have illustrated two brackets, namely 61 and 73, which support the pawls 62 and 74 for operating the cut-out bar 70 in two directions. In the actual construction of my machine I prefer to use this same principle, but to combine the pawls into one and the notches 71 and 77 into one, which will naturally drive the bar 70 in either direction until again being withdrawn by a suitable cam.

It will be understood, of course, that while I have indicated cylindrical packages as being weighed on this machine that its use is applicable to other shapes as well, and I do not confine myself to this particular construction or method of application of my device, but realize that this end may be reached by various means and I therefore intend that this patent shall cover all forms of my device which fall fairly within the appended claims.

What I claim as new and desire to protect by Letters Patent of the United States, is:

1. In a feed stop controlling mechanism, the combination of a feed stop controlling disk mounted on a vertical shaft and having on its upper surface a plurality of concentric pins, a feed controlling lever pivotally mounted along side and resting on said disk between said stop pins, an index plate mounted on a vertical shaft and above the other end of said lever, said index plate having a plurality of cam lobes on its under side adapted to depress said lever and raise its opposite end over said stop pins permitting only one pin to pass.

2. In a can handling device, the combination of a table member, a conveyer belt moving in a groove in said table, a vertical shaft passing through said table alongside of said conveyer, a star wheel secured to the upper end of said vertical shaft above said table top, an index plate on the lower end of said shaft arranged to move the can positively from the conveyer to the scale, and a means for actuating said index plate intermittently.

3. In a selecting mechanism for segregating under-weight articles, the combination of a selecting arm attached to the scale beam of a scale, an oscillating slide under said arm, a pawl mounted on said slide adapted to actuate a can engaging cut-out arm when said pawl is depressed, a latch adapted to hold said pawl out of engagement and adapted to release said pawl when said latch comes in contact with said arm, a means for raising said pawl out of engagement at the completion of its return stroke, and a means for relatching said pawl in its raised position.

4. A can handling device for freeing cans while being weighed consisting of a can handling star wheel mounted on a vertical shaft and adapted to move a package upon a scale pan, an index plate on said vertical shaft, a connecting rod driven by a crank and joined to an arm mounted on said vertical shaft above said index plate, a spring-urged pin mounted in said arm arranged to engage notches in the periphrey of said index plate, and an adjustable index arm engaging said index notches in a manner that the return motion of the connecting rod will back the can-handling star wheel away from said object while being weighed.

5. A cut-out actuating device for selective weighing consisting of an arm mounted parallel to and adjacent to a scale beam in a manner to move in unison with said beam, an oscillating slide member under said arm having formed thereon an upright bracket member on which is hinged a cut-out pawl, to which pawl is attached a supporting latch adapted to engage a catch member formed on the side of said bracket by contact with an arm secured to the base of the machine and be disengaged by contact with the tip of said selecting arm, a notched slide member adapted to be reciprocated by said cut-out pawl whenever it is suspended, a cam for raising said pawl at the return stroke of said notched slide, and a cut-out arm actuated by said notched slide adapted to divert a can from its path when leaving the scale.

6. In a weighing machine, the combination of a table member having a belt conveyer flush with its surface with a feeding mechanism arranged to pass one can along on said conveyer whenever the scale pan is empty, a can-handling mechanism arranged to receive said can and place same on the scale pan, a weighing scale arranged to balance with a can of the correct weight, a locking mechanism arranged to lock said beam after each weighing operation, a cut-out arm arranged to intercept a can as it is being removed from the scale by the handling means, and a means for actuating said cut-out arm when a can is under weight.

THOMAS B. LAMBERT.